United States Patent
Eddleman (10) Patent No.: US 9,448,960 B2
(45) Date of Patent: Sep. 20, 2016

(54) ADDRESS TRANSLATION IN I2C DATA COMMUNICATIONS SYSTEM

(71) Applicant: LINEAR TECHNOLOGY CORPORATION, Milpitas, CA (US)

(72) Inventor: Daniel James Eddleman, Santa Clara, CA (US)

(73) Assignee: LINEAR TECHNOLOGY CORPORATION, Milpitas, CA (US)

( * ) Notice: Subject to any disclaimer, the term of this patent is extended or adjusted under 35 U.S.C. 154(b) by 684 days.

(21) Appl. No.: 13/828,511

(22) Filed: Mar. 14, 2013

(65) Prior Publication Data

US 2014/0281080 A1 Sep. 18, 2014

(51) Int. Cl.
*G06F 13/42* (2006.01)

(52) U.S. Cl.
CPC .................................. *G06F 13/4291* (2013.01)

(58) Field of Classification Search
CPC ................................................... G06F 13/4291
See application file for complete search history.

(56) References Cited

U.S. PATENT DOCUMENTS

| | | | | |
|---|---|---|---|---|
| 7,376,807 B2* | 5/2008 | Moyer | ................ | G06F 12/1027 711/138 |
| 2003/0200359 A1* | 10/2003 | Fernald | ............... | G06F 13/4291 710/5 |
| 2005/0246475 A1* | 11/2005 | Ervin | .................. | G06F 13/4045 710/306 |
| 2008/0256276 A1* | 10/2008 | Ellison | ............... | G06F 13/4295 710/106 |
| 2008/0288684 A1 | 11/2008 | Ellison | | |
| 2011/0289239 A1 | 11/2011 | Zeng et al. | | |
| 2011/0302344 A1* | 12/2011 | Bell | .................... | G06F 13/4291 710/110 |
| 2012/0191889 A1* | 7/2012 | Fischer | ............... | G06F 13/4291 710/110 |

FOREIGN PATENT DOCUMENTS

WO 2006117753 A1 11/2006

OTHER PUBLICATIONS

European Search Report issued in European Application No. 14000608.1-1954 dated Apr. 29, 2014.

* cited by examiner

*Primary Examiner* — Nimesh G Patel
(74) *Attorney, Agent, or Firm* — McDermott Will & Emery LLP (57) ABSTRACT

A novel readdressing circuit is provided for supporting data communications over a data line and a clock line between at least one master device and multiple slave devices. For example, the master device and the multiple slave devices may be configured to communicate over an I2C bus including the data line and the clock line. The readdressing circuit has a data input node for receiving a data signal transferred over the data line and including an address word produced by the master device, and a data output node coupled to the multiple slave devices. The readdressing circuit also includes an address generator and an address transmit detections circuit. The address generator is configured for storing a multi-bit fixed offset value. The address generator is responsive to the address word at the data input node for generating multiple unique addresses for the multiple slave devices. The address transmit detection circuit is configured for enabling the address generator to generate the multiple unique addresses at the data output node when the address word is detected at the data input node, and for preventing an output signal of the address generator from being supplied to the data output node when no address word is detected at the data input node.

15 Claims, 7 Drawing Sheets

FIG. 1
BACKGROUND

FIG. 2
BACKGROUND

ADDRESS TRANSLATION IN I2C DATA COMMUNICATIONS SYSTEM

TECHNICAL FIELD

This disclosure relates to a system for data transfer over I2C bus, and more particularly, to an address translation device in an I2C data communications system.

BACKGROUND ART

Figure 1:
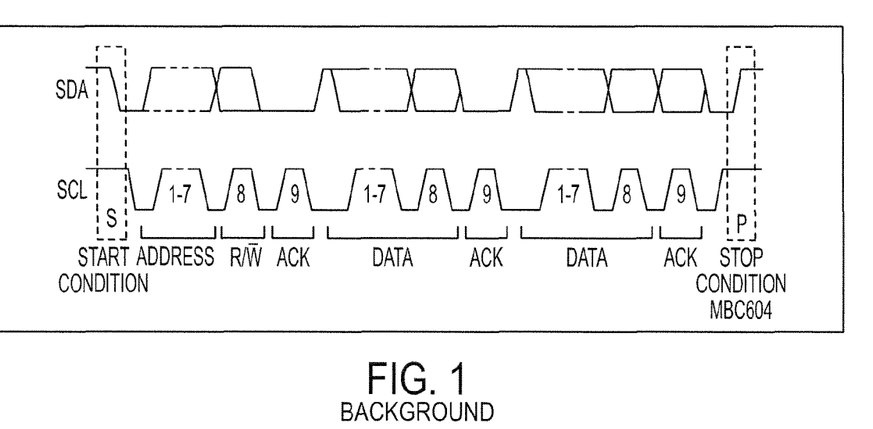
FIG. 1 illustrates an I2C data transaction over data and clock lines.

The Inter-Integrated Circuit (I2C) specification defines transactions between masters and slaves over an I2C bus that uses only two bidirectional open-drain lines, Serial Data Line (SDA) and Serial Clock Line (SCL), pulled up with resistors. FIG. 1 is a timing diagram illustrating a protocol for data communications between a master and a slave over the SDA and SCL lines. The data transfer is initiated with a start bit S when SDA is pulled low while SCL stays high. Then, seven address bits are transferred followed by a read/write bit R/W/indicating whether the data bytes in the transaction are being read or written. Acknowledgement bits ACK are transferred to acknowledge receipt of preceding information. When the data transfer is complete, a stop bit P is sent by releasing the SDA line to allow it to be pulled up while SCL is maintained high.

Figure 2:
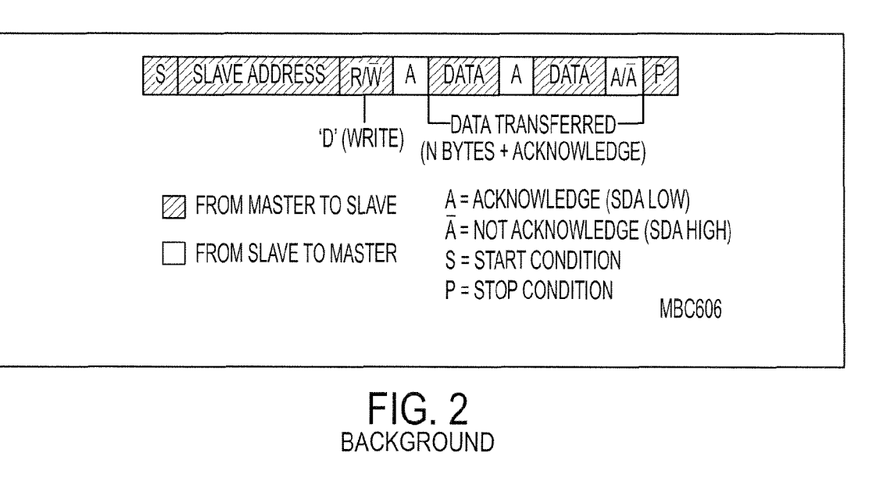
FIG. 2 illustrates a format of an I2C data transaction.

FIG. 2 illustrates a simplified format of a serial data transaction between a master and a slave. The serial data transaction is initiated by the start bit S transferred from the master. The start bit field S is followed by the 7-bit slave address field identifying the slave addressed by the master. The read/write bit field R/W/ indicates whether the master writes or reads the DATA bytes. The "0" bit indicates that the master writes the data to the slave. The slave responds with the acknowledgement bit A. By pulling the SDA low, the slave acknowledges receipt of the information from the slave. When the SDA is high, the receipt is not acknowledged. The data transfer ends with the stop bit P transferred from the master to the slave.

The I2C specification allocates a 7-bit word to the address field of a standard I2C transaction allowing up to 128 slave devices on a single I2C bus. However, most slave devices can be configured to only a limited number of different addresses, for example, to one of eight different I2C addresses. This restricts the number of identical slave devices on an I2C bus. For example, if each slave device can be configured to one of eight different I2C addresses, only eight slave devices of the same type could appear on one I2C bus.

Another difficulty commonly faced by system designers is that identical add-in cards may connect to a shared backplane. It would be desirable to use a single I2C bus to communicate with all of the add-in cards, but this is not possible because the cards respond to identical I2C addresses.

In these situations, the system designer usually splits one I2C bus into multiple buses using an I2C multiplexer. This requires additional I2C transactions with the multiplexer connecting the appropriate bus when communicating with a specific slave or add-in card. This consumes valuable bandwidth and adds complexity to the firmware implementation.

Therefore, there is a need in an address translation device that would translate a slave address indicated by a master to other addresses selected so as to allow up to 128 slave devices to connect to a single bus even when the slaves are configured to respond to only a limited number of addresses.

SUMMARY OF THE DISCLOSURE

In accordance with one aspect of the present disclosure, a readdressing circuit is suggested for providing data communications over a data line and a clock line between at least one master device and multiple slave devices. For example, the master device and the multiple slave devices may be configured to communicate over an I2C bus including the data line and the clock line.

The readdressing circuit has a data input node for receiving a data signal transferred over the data line and including an address word produced by the master device, and a data output node coupled to the multiple slave devices. The readdressing circuit includes an address generator and an address transmit detection circuit.

The address generator is configured for storing a multi-bit fixed offset value. The address generator is responsive to the address word at the data input node for generating multiple unique addresses for the multiple slave devices.

The address transmit detection circuit is configured for enabling the address generator to generate the multiple unique addresses at the data output node when the address word is detected at the data input node, and for preventing an output signal of the address generator from being supplied to the data output node when no address word is detected at the data input node.

The address transmit detection circuit may be configured for providing a bypass line for transferring the data signal from the data input node to the data output node bypassing the address generator, when no address word is detected at the data input node.

The address transmit detection circuit may control a data line switch for connecting the data input node to the data output node when no address word is detected at the data input node.

The address generator may include a shift register for storing the multi-bit fixed offset value. The shift register is configured for shifting the offset value in response to a clock signal transmitted over the clock line.

The address generator may further include a logic circuit responsive to an output signal of the shift register and the address word transferred over the data line, to produce an address signal representing the offset value and the address word.

For example, the logic circuit may include an XOR circuit having one input responsive to the output signal of the shift register and another input responsive to the address word.

The address transmit detection circuit may be configured for preventing the address signal from being supplied to the data output node when no address word is detected at the data input node.

The address transmit detection circuit may reset the shift register to an initial state in which the shift register contains the offset value, when the address transmit detection circuit detects that transfer of the address word over the data line is completed.

An offset input circuitry may be arranged for loading the offset value into the shift register. The offset input circuitry may include an analog-to-digital converter for producing a digital offset value based on an analog offset value.

In accordance with another aspect of the disclosure, a system for providing data communications over data and clock lines comprises at least one master device, a plurality of slave devices arranged in multiple groups, and multiple readdressing circuits respectively corresponding to the multiple groups of the slave devices. Each readdressing circuit is configured for producing multiple unique addresses identifying multiple slave devices in a corresponding group.

The readdressing circuit has a data input node for receiving a data signal transferred over the data line and including an address word produced by the master, and a data output node coupled to the multiple slave devices in the group. An address generator is configured storing a multi-bit fixed offset value. The address generator is responsive to the address word at the data input node for generating multiple unique addresses corresponding to the multiple slave devices in the group. An address transmit detection circuit is configured for enabling generation of the multiple unique addresses at the data output node when the address word is detected at the input node, and for preventing an output signal of the address generator from being supplied to the data output node when no address word is detected at the data input node.

In accordance with a method of the present disclosure, the following steps are carried out to provide data communications over a data line and a clock line between at least one master device and multiple slave devices:

storing a multi-bit address offset value, detecting when an address word is being transmitted from the master device, shifting the offset value in response to a clock signal in the clock line to produce a shifted value, performing a logic operation with the address word and the shifted value to produce a translated address word, and providing the translated address word to the slave devices instead of the address word transmitted from the master device.

The translated address word may be prevented from being supplied to the slave devices when no address word is transmitted from the master device.

For example, an XOR operation may be performed with the address word and the shifted value to produce the translated address word.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using specific examples in the I2C environment. It will become apparent, however, that the concept of the disclosure is applicable to any address translation device in any system for providing communications between masters and slaves.

Figure 3:
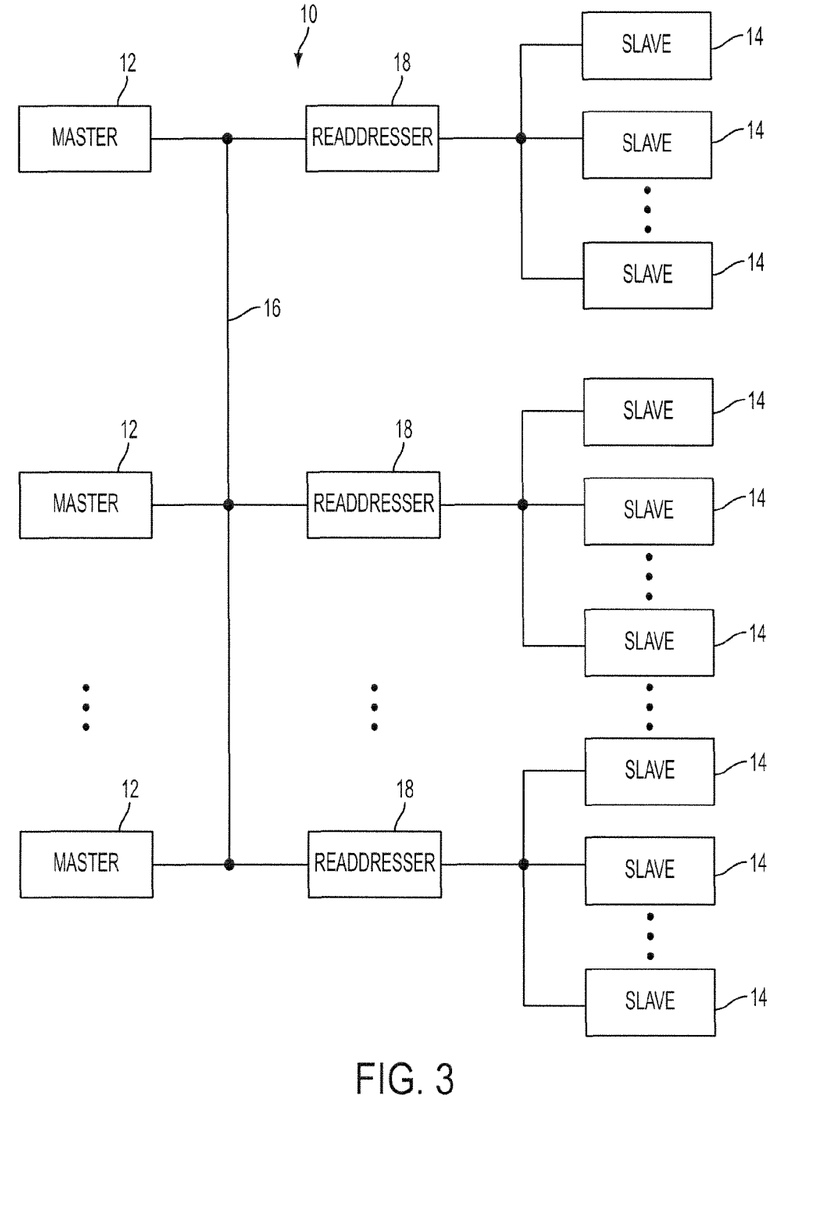
FIG. 3 shows an exemplary embodiment of an I2C system for providing data communications in accordance with the present disclosure.

FIG. 3 illustrates an exemplary data communications system 10 for providing data communications between at least one or more master devices 12 and multiple slave devices 14 over a communication bus 16. For example, the master devices 12 and slave devices 14 may communicate over a I2C bus 16 using the data communication protocol defined in the I2C specification. The system 10 may include readdressing circuits 18, each of which is configured for supporting a group of the slave devices 14. In particular, each readdressing circuit 18 is configured to respond to a slave address produced by any one of the master devices 12 by producing multiple unique addresses identifying multiple slave devices 14 in the corresponding group.

As discussed above, up to 128 slave devices 14 may be connected to a single I2C bus 16. To communicate with the master devices 12, each of the slave devices 14 must have a unique address. However, this may not always be possible because some of the slave devices 14 may only be configurable to a few addresses. The readdressing circuits 18 enable multiple slave devices 14 configured to the same addresses to communicate with the same master device 12 or with the same group of the master devices 12. Due to the address translation performed by the readdressing circuit 18, the slave devices 14 with the same address appear on the bus 16 as devices having unique addresses.

Figure 4:
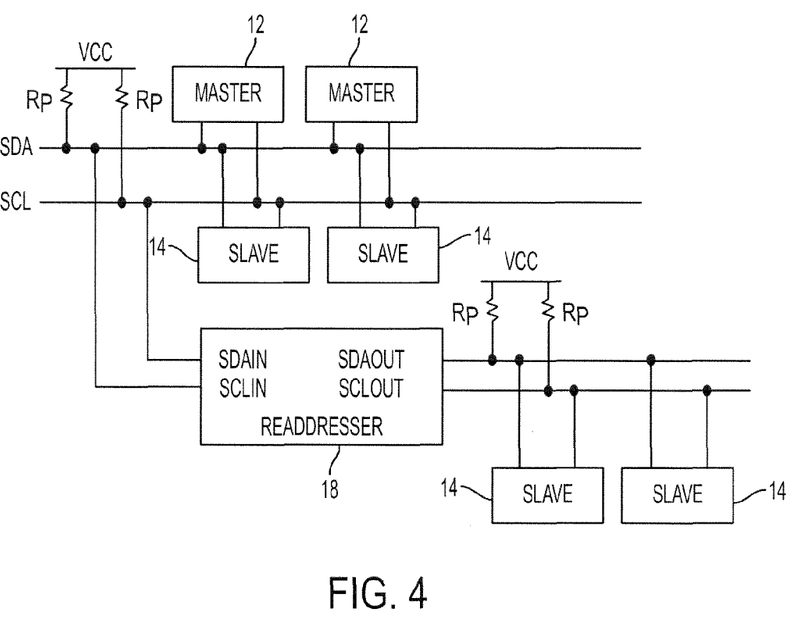
FIG. 4 illustrates an exemplary I2C arrangement in accordance with the present disclosure.

FIG. 4 illustrates an exemplary connection of the readdressing circuit 18 to an I2C bus including an SDA data line and an SCL clock line. The readdressing circuit 18 has a data input node SDAIN and a clock input node SCLIN respectively connected to the SDA and SCL lines for providing data communications with one or more master devices 12. Also, the readdressing circuit 18 has a data output node SDAOUT and a clock output node SCLOUT respectively connected to the SDA and SCL line for providing data communications with one or more slave devices 14. Pull-up resistors Rp are connected to the SDA and SCL lines to provide data communications over the standard open-drain configuration of the I2C bus. The pull-up resistors Rp are coupled to a source of power supply voltage Vcc.

As shown in FIG. 4, some of the slave devices 14 are connected to communicate with the master devices 12 via the readdressing circuit 18. However, some of the slave devices 14 in the system 10 may be configured for communicating with the master devices 12 directly, without the address translation performed by the readdressing circuit 18.

Figure 5:
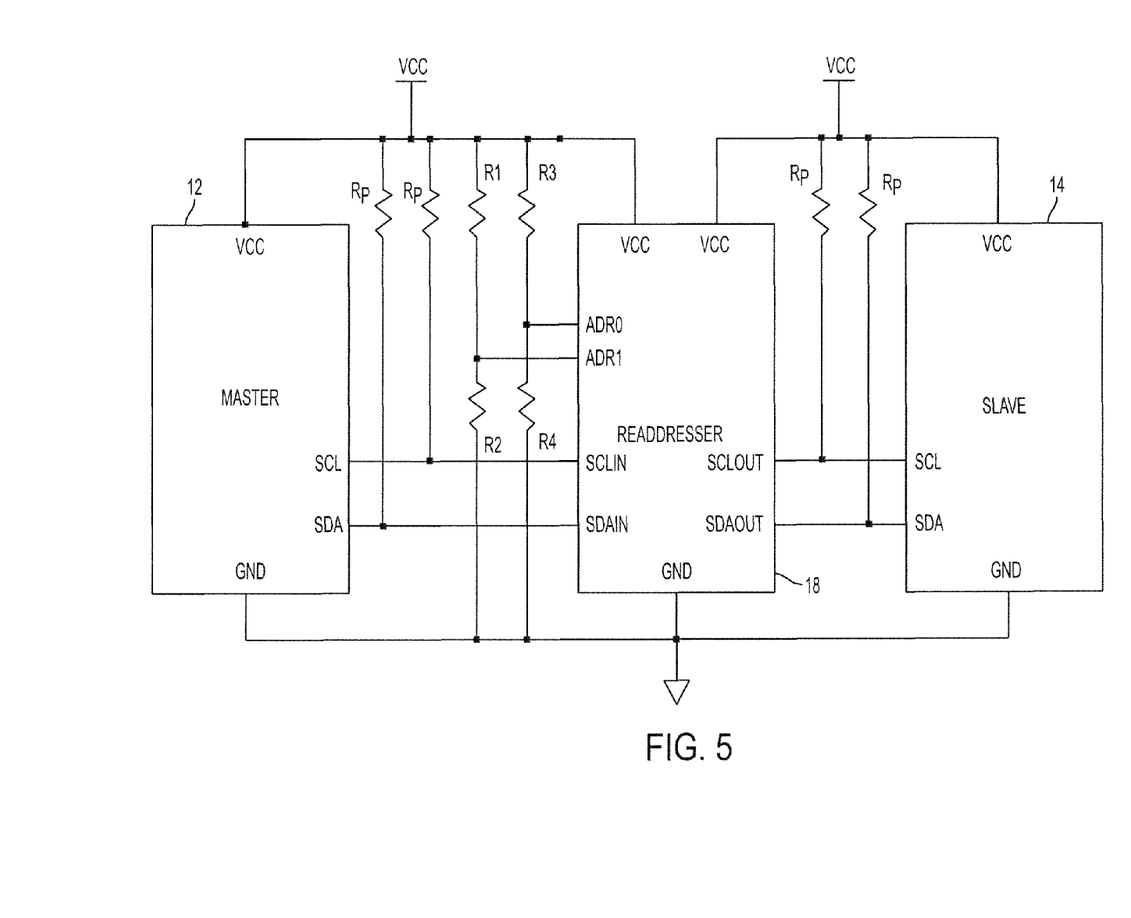
FIG. 5 shows an exemplary connection between a master device and a slave device in accordance with the present disclosure.

FIG. 5 illustrates an exemplary I2C arrangement for providing data communications between the slave device 14 and the master device 12 via the readdressing circuit 18. The data and clock inputs SDAIN and SCLIN of the readdressing circuit 18 are connected via the SDA and SCL lines of the I2C bus to the respective data and clock nodes SDA and SCL of the master device 12. The data and clock outputs SDAOUT and SCLOUT of the readdressing circuit 18 are connected via the SDA and SCL lines of the I2C bus to the respective data and clock nodes SDA and SCL of the slave device 14.

Also, as discussed in more detail later, the readdressing circuit 18 has address offset input nodes ADR0 and ADR1 configured for providing input of a unique address offset value to each readdressing circuit 18. Respective voltage dividers composed of resistors R1, R2 and R3, R4 are arranged for entering desired address offset values via the address offset input nodes ADR0 and ADR1.

Figure 6:
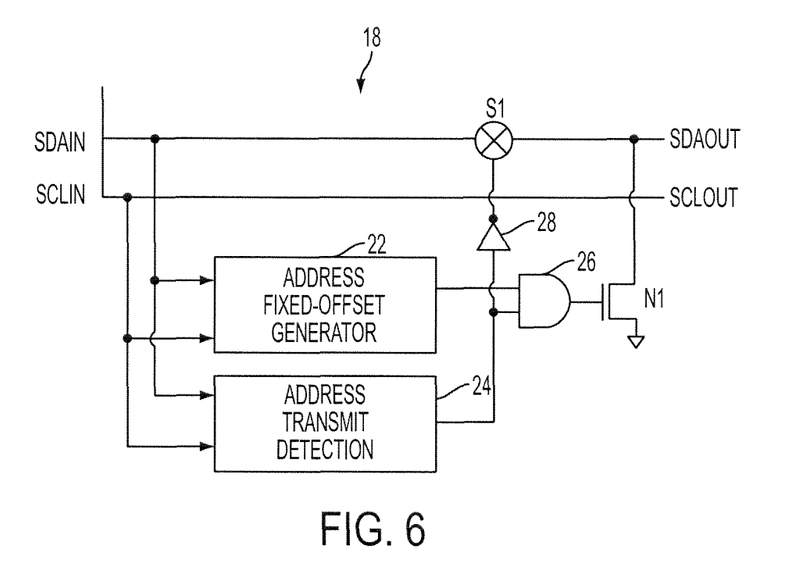
FIG. 6 illustrates an exemplary embodiment of a readdressing circuit in accordance with the present disclosure.

FIG. 6 illustrates an exemplary arrangement of the readdressing circuit 18 in accordance with the present disclosure. The readdressing circuit 18 includes an address fixed-offset generator 22 that stores a multi-bit fixed offset value which is unique for a particular readdressing circuit 18. The address fixed-offset generator 22 is responsive to the address word at the data input node SDAIN for generating multiple unique addresses corresponding to the multiple slave devices 14 in the group corresponding to the particular readdressing circuit 18.

For example, as disclosed in more detail below, the address offset generator 22 may include a shift register controlled by a clock signal from the clock input node SCLIN for shifting the fixed offset value. The address fixed-offset generator 22 may perform a pre-set logic operation with the output of the shift register and the address word at the SDAIN input so as to produce an address signal representing the offset value and the address word. In particular, the address fixed-offset generator 22 may include an XOR logic circuit for performing an XOR operation with the output of the shift register and the address word at the SDAIN input so as to produce a unique address for one of the slave devices 14 in a group supported by the particular readdressing circuit 18.

The data output of the readdressing circuit 18 is controlled by an address transmit detection circuit 24 that enables generation of the multiple unique addresses at the data output node SDAOUT when the address word from the master device 12 is detected at the data input node SDAIN. The address transmit detection circuit 24 prevents an output signal of the address offset generator 22 from being supplied to the data output node SDAOUT when no address word is detected at the data input node SDAIN.

For example, the readdressing circuit 18 may include a switch S1 arranged between the SDAIN data input node and the SDAOUT data output node. When the address bits are being transmitted from the master device 12, the address transmit detection circuit 24 may open the switch S1 to prevent a signal provided at the SDAIN data input node from being directly supplied to the SDAOUT data output node. At the same time, the address transmit detection circuit 24 enables an output pull-down transistor N1 to provide the output signal of the address fixed-offset generator 22 to the SDAOUT data output node. In particular, the address transmit detection circuit 24 may open the switch S1 in response to the start bit of an I2C transaction.

After the 7-bit address is sent or if a stop bit aborts the I2C transmission, the address transmit detection circuit 24 may close the switch S1 to create a bypass line enabling a data signal at the SDAIN node to pass directly to the SDAOUT node, bypassing the address fixed-offset generator 22. At the same time, the address transmit detection circuit 24 prevents the output signal of the address fixed-offset generator 22 from being provided to the output pull-down transistor N1.

For example, the readdressing circuit 18 may include an AND gate 26 having one input responsive to the output signal of the address fixed-offset generator 22, and another input controlled by the address transmit detection circuit 24. The output of the AND gate 26 is configured to enable or disable the data output via the pull-down transistor N1. The output of the address transmit detection circuit 24 may control the switch S1 via an inverting buffer 28.

Figure 7:
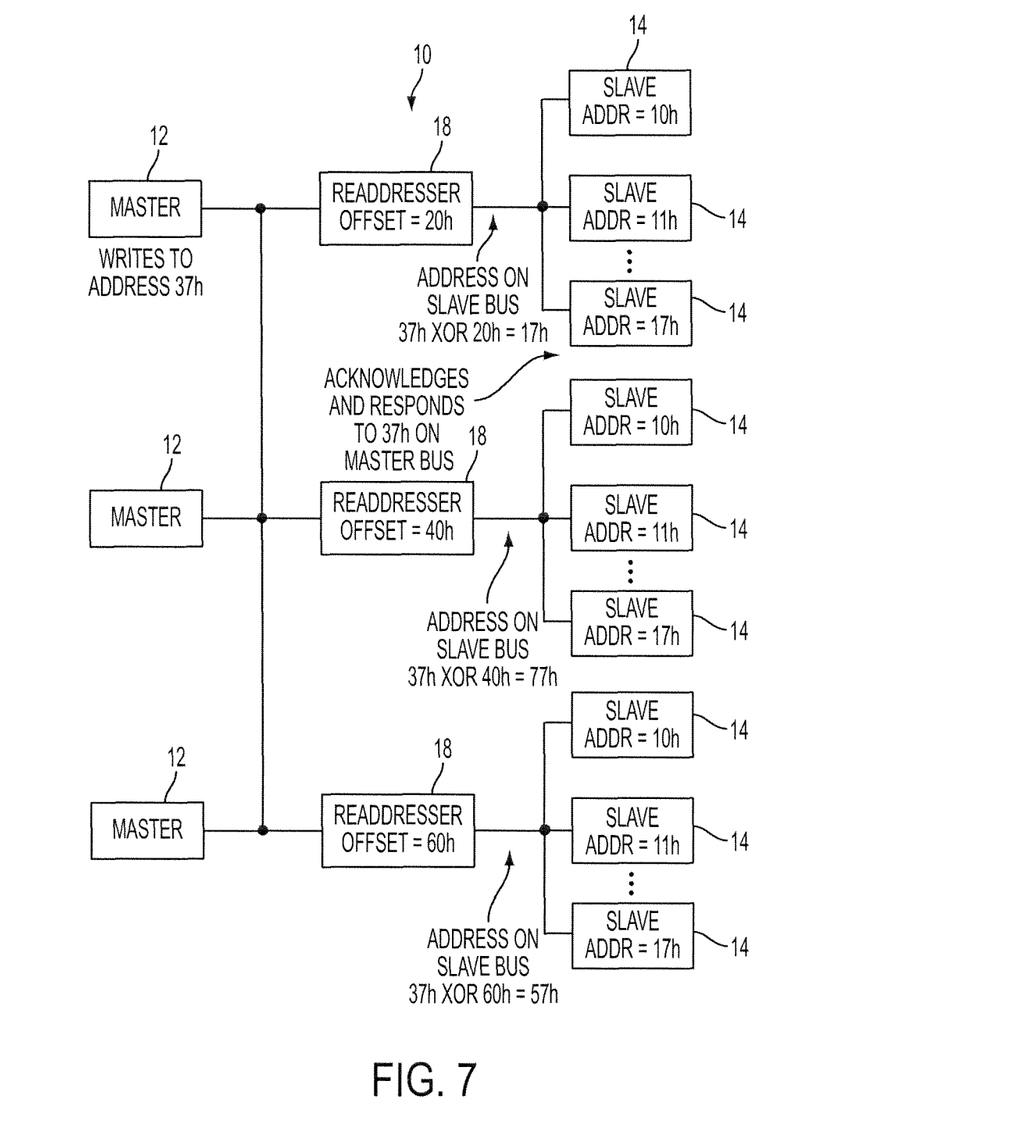
FIG. 7 shows an example of producing slave addresses by multiple readdressing circuits.

FIG. 7 shows an example of the address translation performed by the readdressing circuit 18. In this example, the slave devices 14 are arranged in 3 groups, each of which includes the slave devices 14 having addresses from 10h to 17h. Each of the groups communicates with the master devices 12 via a separate readdressing circuit 18. The readdressing circuit 18 for the first group of the slave devices is loaded with the offset value of 20h. The readdressing circuit 18 for the second group has the offset value of 40h. The readdressing circuit 18 for the third group has the offset value of 60h.

When one of the master devices 12 initiates an I2C transaction to write to the slave device having address 37h, the first readdressing circuit 18 performs an XOR operation to XOR the address 37h by its offset value of 20h resulting in address 17h provided on the first group of the slave devices 14. After the address is transmitted, the I2C buses on both sides of the readdressing circuit 18 are connected. The second readdressing circuit 18 performs an XOR operation to XOR the address 37h by its offset value of 40h resulting in address 77h provided to the second group of the slave devices. After the address is transmitted, the I2C buses on both sides of the readdressing circuit 18 are connected. The third readdressing circuit 18 performs an XOR operation to XOR the address 37h by its offset value of 60h resulting in address 77h provided to the second group of the slave devices. After the address is transmitted, the I2C buses on both sides of the readdressing circuit 18 are connected. Only one slave device 14 in the system 10 has the address provided by the readdressing circuits 18. In particular, the last slave device 14 in the first group has address 17h provided by the first readdressing circuit 18. This slave device 14 acknowledges the I2C transaction with address 37h performed by the master device 12 and responds to the master device's transaction.

Figure 8:
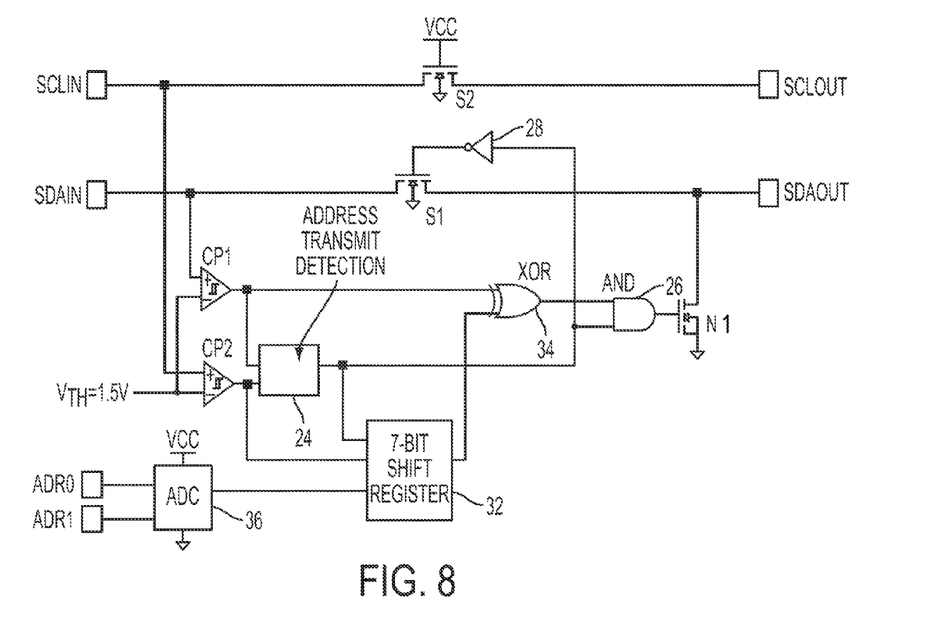
FIG. 8 shows an exemplary implementation of the readdressing circuit in accordance with the present disclosure.

FIG. 8 illustrates an exemplary implementation of the readdressing circuit 18. As discussed above in connection with FIG. 6, the readdressing circuit 18 includes the address fixed-offset generator 22 and the address transmit detection circuit 24. The address fixed-offset generator 22 may be implemented using a 7-bit shift register 32 and an XOR circuit 34. In addition to the switch S1 between the SDAIN node and the SDAOUT node discussed above, a switch S2 may be provided between the SCLIN node and the SCLOUT node. This switch always remains closed. Its purpose is to balance delays so that the clock line delay will match the delay introduced by switch S1 in the data line. For example, field effect transistors may be used as switches S1 and S2.

An analog-to-digital converter (ADC) 36 may be arranged between the address offset input nodes ADR0 and ADR1 and the 7-bit shift register 32 for converting an analog offset value into a digital 7-bit fixed offset value loaded into the 7-bit shift register 32. Hysteresis comparators CP1 and CP2 are provided for detecting information at the SDAIN and SCLIN input nodes. In particular, inverting inputs of CP1 and CP2 may be supplied with a threshold voltage $V_{TH}$ which, for example, may be equal to 1.5V. Non-inverting inputs of the CP1 and CP2 may be respectively coupled to the SDAIN and SCLIN nodes.

The output signals of the CP1 and CP2 are provided to the address transmit detection circuit 24 to enable this circuit to detect the start bit, the end of the address bits and the stop bit in an I2C transaction. The output signal of the CP2 is also provided to a clock input of the shift register 32 that shifts the offset value stored in the shift register 32 in response to clock signals at the SCLIN input.

Initially, the switch S1 may be closed to allow direct data transfer over the SDA line between the slave devices 14 and the master devices 12. When the address transmit detection circuit 24 detects the start bit S in an I2C transaction from any master device 12, the address transmit detection device 24 provides an output signal to open the switch S1 so as to prevent address bits from being transferred directly to the slave devices 14. The output signal of the address transmit detection device 24 is also supplied to the AND gate 26 to enable address output from the pull-down transistor N1.

In response to each clock signal corresponding to each address bit in the I2C transaction, the shift register 32 shifts the offset value to generate an output value supplied to one input of the XOR circuit 34. The other input of the XOR circuit 34 is connected to the output of the CP1 to provide the XOR circuit 34 with the address word detected on the SDAIN input node. The output value of the XOR circuit 34 is supplied via the AND gate 26 and the enabled pull-down transistor N1 to the SDAOUT data output node, and is provided as the respective address bits to the slave devices 14 connected to the readdressing circuit 18.

When the address transmit detection circuit 24 detects that all seven address bits have been transmitted or detects a stop bit P issued by the master device 12 to abort the I2C transaction, the address transmit detection circuit 24 produces an output signal to close the switch S1 and to disable the address output via the AND gate 26. This output signal also may be supplied to the shift register 32 to reset the shift register 32 resets the shift register to an initial state in which the shift register 32 contains the fixed offset value. Hence, when address bits are not being transmitted from a master device 12, the master devices 12 and slave devices 14 are enabled to communicate directly over the data and clock lines bypassing the address fixed-offset generator 22.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A readdressing circuit for providing data communications over a data line and a clock line between at least one master device and multiple slave devices, comprising:
   a data input node for receiving a data signal transferred over the data line and including an address word produced by the master device,
   a data output node coupled to the multiple slave devices,
   an address generator for storing a multi-bit fixed offset value, the address generator being responsive to the address word at the data input node for generating multiple unique addresses for the multiple slave devices and providing the translated address immediately to the data output node without requiring extra clock cycles, and
   an address transmit detection circuit for allowing the multiple unique addresses to be provided at the data output node when the address word is detected at the data input node, and for preventing an output signal of the address generator from being supplied to the data output node when the address word is not detected at the data input node.

2. The circuit of claim 1, wherein the address transmit detection circuit is configured for providing a bypass line for transferring the data signal from the data input node to the data output node bypassing the address generator, when the address word is not detected at the data input node.

3. The circuit of claim 2, further comprising a data line switch controlled by the address transmit detection circuit for connecting the data input node to the data output node when the address word is not detected at the data input node.

4. The circuit of claim 1, wherein the address generator includes a shift register for storing the multi-bit fixed offset value, the shift register being configured for shifting the offset value in response to a clock signal transmitted over the clock line.

5. The circuit of claim 4, wherein the address generator further includes a logic circuit responsive to an output signal of the shift register and the address word transferred over the data line, to produce an address signal representing the offset value and the address word.

6. The circuit of claim 5, wherein the logic circuit includes an XOR circuit having one input responsive to the output signal of the shift register and another input responsive to the address word.

7. The circuit of claim 5, wherein the address transmit detection circuit is configured for preventing the address signal from being supplied to the data output node when the address word is not detected at the data input node.

8. The circuit of claim 4, wherein the address transmit detection circuit resets the shift register to an initial state in which the shift register contains the offset value, when the address transmit detection circuit detects that transfer of the address word over the data line is completed.

9. The circuit of claim 4, further comprising offset input circuitry for loading the offset value into the shift register.

10. The circuit of claim 9, wherein the offset input circuitry includes an analog-to-digital converter for producing a digital offset value based on an analog offset value.

11. The circuit of claim 1, wherein the master device and the multiple slave devices are configured to communicate over an I2C bus including the data line and the clock line.

12. A system for providing data communications over a data line and a clock line, comprising:
   at least one master device,
   a plurality of slave devices arranged in multiple groups,
   multiple readdressing circuits corresponding to the multiple groups of the slave devices, each readdressing circuit is configured for producing multiple unique addresses identifying multiple slave devices in a corresponding group,
   the readdressing circuit including:
   a data input node for receiving a data signal transferred over the data line and including an address word produced by the master, a data output node coupled to the multiple slave devices in the group, an address generator for storing a multi-bit fixed offset value, the address generator being responsive to the address word at the data input node for generating multiple unique addresses corresponding to the multiple slave devices in the group and providing the translated address immediately to the data output node without requiring extra clock cycles, and an address transmit detection circuit for allowing the multiple unique addresses to be provided at the data output node when the address word is detected at the input node, and for preventing an output signal of the address generator from being supplied to the data output node when the address word is not detected at the data input node.

13. A method of providing data communications over a data line and a clock line between at least one master device and multiple slave devices arranged in a group, the method comprising the steps of:

storing a multi-bit address offset value, detecting when an address word is being transmitted from the master device, shifting the offset value in response to a clock signal in the clock line to produce a shifted value, performing a logic operation with the address word and the shifted value to produce a translated address word, and immediately providing the translated address word to the slave devices instead of the address word transmitted from the master device and without requiring additional clock cycles.

14. The method of claim 13, wherein the translated address word is prevented from being supplied to the slave devices when the address word is not transmitted from the master device.

15. The method of claim 14, wherein an XOR operation is performed with the address word and the shifted value to produce the translated address word.

* * * * *